July 9, 1963  P. D. WENZEL  3,097,004
EARTH WORKING DEVICE
Filed June 2, 1961  2 Sheets-Sheet 1
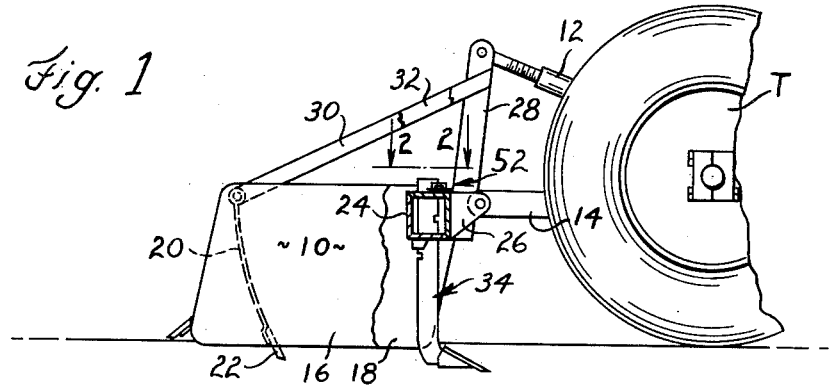
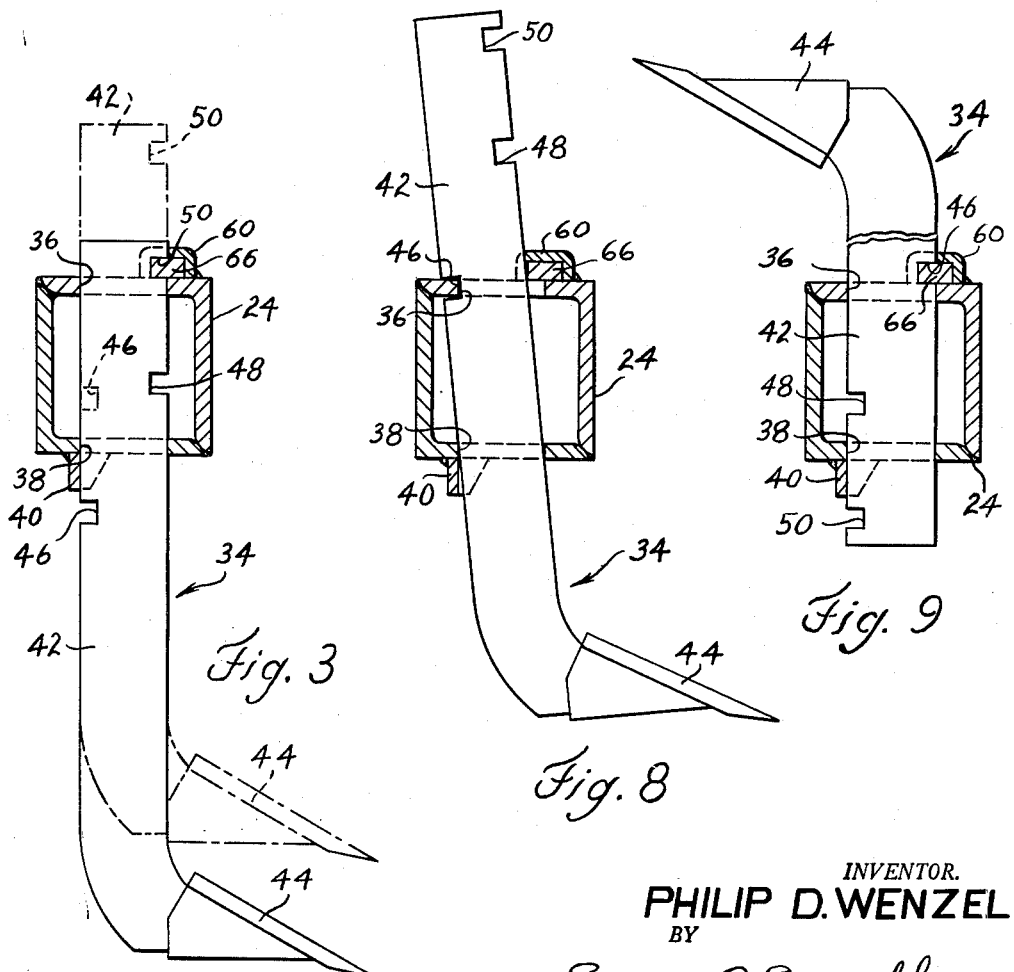
INVENTOR.
PHILIP D. WENZEL
BY
Emerson B Donnell
ATTORNEY July 9, 1963 P. D. WENZEL 3,097,004
EARTH WORKING DEVICE
Filed June 2, 1961 2 Sheets-Sheet 2

INVENTOR.
PHILIP D. WENZEL
BY
Emerson B Donnell
ATTORNEY

# United States Patent Office 3,097,004
Patented July 9, 1963

3,097,004
EARTH WORKING DEVICE
Philip D. Wenzel, Stockton, Calif., assignor to J. I. Case Company, Racine, Wis., a corporation of Wisconsin
Filed June 2, 1961, Ser. No. 114,465
4 Claims. (Cl. 287—56)

This invention relates to a scraper device for scraping, scarifying, and leveling ground surfaces, and more particularly to a latch arrangement for locking scarifier teeth in place on a scraper framework.

In the past, scarifier teeth of the type to which this invention is directed have been held in place on scrapers by keeper members having various configurations, such for example, as that of a wedge. These keeper members are usually loose in relation to the scraper framework and are forced into position to lock the scarifying members to the scraper frame. The disadvantage with this type of scarifier tooth keeper member is the possibility that the keeper member will become dislodged and lost. This situation frequently occurs when the machine is in a ground working position, and the vibration created by the scarifier tooth working in rough terrain loosens the keeper member and it eventually works out of position and falls out. If the keeper member is lost, the scarifier tooth can no longer be held in a ground working position positively secured to the scraper framework, and therefore it will not be able to function effectively.

Therefore it is the principal object of this invention to provide latch locking mechanism for securing scarifier teeth to a scraper wherein a shiftable latch mechanism is nevertheless positively secured to the scraper framework.

It is a further object of this invention to provide a latch locking mechanism including a novel locking means for holding the latch member in its locked position.

Further objects are to provide such a locking means which is easily and quickly unlocked but which has no tendency to become dislodged by vibration or any other usual outside force, such a locking means which also acts as a handle for readily shifting the latch member, and such a locking means which stands, when unlocked, in a position to be readily grasped for shifting the latch.

Figure 2:
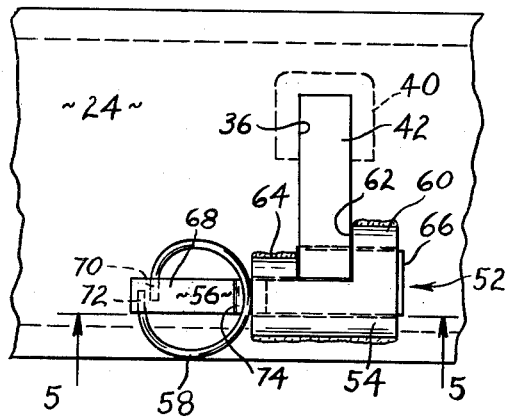
Figure 5:
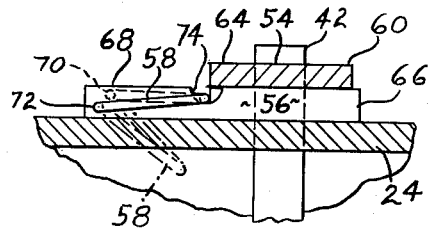
Figure 4:
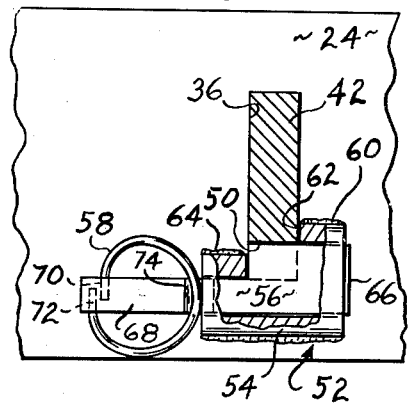
Figure 6:
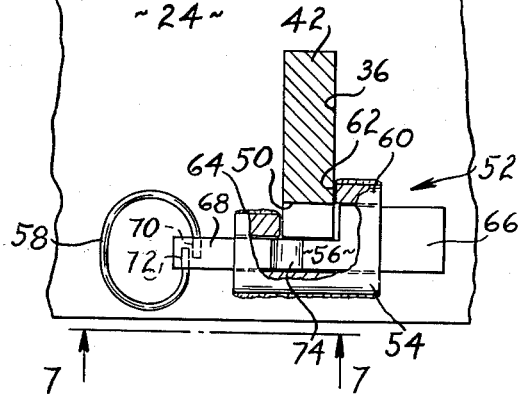
Figure 7:
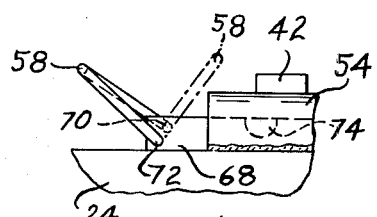

Other objects and advantages of the invention will become apparent to those skilled in the art when considered with the following detailed description and accompanying drawings, in which:

FIGURE 1 is a side elevational view of a scraper embodying the present invention, with parts broken away;
FIG. 2 is a fragmentary plan view of the scarifier tooth latch locking mechanism taken on line 2—2 of FIG. 1;
FIG. 3 is a fragmentary side elevational view of the scarifier tooth as shown in FIG. 1, and illustrating the scarifier tooth in two of its adjusted ground working positions;
FIG. 4 is a view of the scarifier tooth latch locking mechanism as shown in FIG. 2 with parts broken away, and illustrating the latch mechanism in the locked position;
FIG. 5 is a vertical sectional view of the scarifier tooth latch locking mechanism taken on line 5—5 of FIG. 2;
FIG. 6 is a view of the latch locking mechanism such as shown in FIG. 2 with parts broken away, and illustrating the latch mechanism in the unlocked position;
FIG. 7 is a fragmentary view of the latch locking mechanism taken on line 7—7 of FIG. 6;
FIG. 8 is a side elevational view of the scarifier tooth as shown in FIG. 3 and illustrating the tooth raised to a non-working position;
FIG. 9 is a side elevational view of the scarifier as shown in FIG. 3 and illustrating the tooth in the fully raised, non-working position.

Generally stated, this invention is practiced by providing a latch mechanism for positively securing a scarifier tooth member to a scraper framework in which the mechanism is positively fixed to the scraper framework and includes a shiftable latch and a locking member for retaining the latch on the tool bar, said locking member being also used for holding the latch in an adjusted position.

Referring now to the drawings, it will be seen in FIG. 1 that a scraper 10 is suitably mounted on a tractor T by a conventional three-point hitch mechanism which includes an upper link 12 and a pair of spaced apart lower link members 14, only one of which is shown.

The scraper 10 has side wall portions 16 and 18 and a transversely extending rear wall portion 20. The rear wall portion 20 is in the form of a curved scraper moldboard and is provided with a scraper blade member 22. Extending between the sidewalls 16 and 18 at their forward ends is a preferably rectangular tool or supporting bar 24. The tool bar 24 forms a part of the scraper framework and is provided with a pair of spaced apart hitch receiving members 26, only one of which is shown in FIG. 1, and which are adapted to be connected to the lower links 14 of the three-point hitch mechanism. An upstanding hitch or mast member 28 is secured to the tool bar 24 and is adapted to be connected to the upper link 12 of the three-point hitch mechanism. Brace members 30 and 32 are suitably secured between the rear wall portion 20 of the scraper 10 and the hitch member 28 to further support the hitch member 28.

The tool bar 24 functions as part of the scraper framework as previously explained, and also serves to support a plurality of scarifier tooth members, generally designated as 34. Since the scarifier tooth members 34 and their associated parts are identical, it is only necessary to illustrate and describe one of the tooth members 34 in order to fully explain and understand the invention. It will be noted in FIGS. 2 and 3 that the tool bar 24 is in the present instance of box section and is formed with a pair of vertically aligned upper and lower slots 36 and 38 which are adapted to receive the scarifier tooth member 34. A plurality of these pairs of aligned slots are spaced apart along the length of the tool bar 24, one pair for each of the scarifier tooth members 34. Referring to FIG. 3, it can be seen that a channel shaped bracket 40 is welded to the lower side of the tool bar 24 in alignment with the tool bar slot 38. The bracket 40 embraces three sides of the scarifier tooth member 34 and braces it in its ground working position against the very substantial rearward force of the ground reaction which is concentrated at this point.

Each scarifier tooth member 34 includes a shank portion 42 and a replaceable tooth point portion 44. The shank portion 42 has a plurality of spaced apart notches 46, 48, and 50, which are utilized with a latch and locking mechanism, generally designated as 52 to secure the scarifier tooth 34 to the tool bar 24 in various selected positions relative to the ground.

As seen in FIGS. 2, 4, and 6, the latch and locking mechanism 52 is positioned on the tool bar 24 and includes a latch guide member 54, a latch member 56, and a ring, grip, or locking member 58. The latch guide member 54 is channel shaped in configuration and comprises an enlarged end portion 60, a cutaway or notched portion 62, and a reduced end portion 64. As can be seen in FIG. 2, the cutaway portion 62 is aligned with the slot 36 of the tool bar 24 and the latch guide member 54 is welded in this position to the tool bar 24.

Latch member 56 is slidably disposed within the latch guide member 54 and includes an enlarged notch engaging end portion 66 and a slide portion 68. As seen in FIGS. 4 and 6, the enlarged end portion 66 of the latch member 56 is disposed in the enlarged end portion 60 of the latch guide 54 and can be slid in one direction until it abuts the reduced end portion 64 of the latch guide 54.

In this particular position, the enlarged end portion 66 is located across the slot 36 of the tool bar 24. When the scarifier tooth shank 42 is located in the slots 36 and 38 of the tool bar 24, one of the number of notches 46, 48, and 50 is readily positioned in alignment with the enlarged end portion 66 of the latch member 56, and the enlarged end portion 66 is engaged in the desired notch.

Located on the slide portion 68 of the latch member 56 is a combined grip and locking member 58 which serves not only as a handle for readily shifting latch 56, but also acts to positively prevent complete removal of the latch from guide 54, and, when enlarged portion 66 is engaged with one of the notches in shank 42, positively maintains the latch in such position against displacement by vibrations or the like. While different types of grip members might be utilized, it is preferred to use a ring member pivoted to the latch 56 in such a manner as to have a position in which it is biased to lie along the length of the latch and in position to contact the reduced portion 64 of guide 60, to prevent removal of latch 56 entirely from guide 60, and another position in which it is readily gripped, even with a gloved hand. It will be noted that the end portions of the ring locking member 58 are inserted in vertically and horizontally spaced apart apertures 70 and 72 defined in the slide portion 68 of latch member 56. When the ring member end portions are inserted in the apertures 70 and 72, the circular ring is distorted and placed under stress.

By reason of the spacing of apertures 70 and 72, it will be apparent that, as ring member 58 is swung in apertures 70 and 72, it will be distorted more in one position than another. Thus, in the full line position shown in FIG. 7, the end portions of the ring are misaligned and held in positions on either side of the general plane of the ring. However in the dotted position, the ends are misaligned but this time in the plane of the ring (see also FIG. 4) and which stresses the ring more strongly than the distortion present in the full line position. The ring therefore tends to return to the full line position except when placed exactly in the dotted position, which is generally termed the "dead center" position, and rather strongly resists displacement from the full line position because of the increased distortion which such movement introduces into the ring.

When ring 58 is displaced in the other direction from the dotted position in FIG. 7, it tends to take up the dotted position in FIG. 5, but is prevented from doing so by the presence of portion 68 of latch 56. Therefore, ring 58, in attempting to reach the dotted position in FIG. 5, presses strongly and continuously against the bottom of a notch 74 in portion 68 and is thus biased to yieldingly press against the latch member outside of guide member 60.

In FIG. 5 position of the parts, ring or grip 58 is disposed substantially in a plane parallel to the path of movement of latch 56 so that a displacing force, for example to the right in FIG. 5, will have no tendency to swing grip 58 to allow inadvertent shifting of latch 56. As seen in FIGS. 2 and 5, the ring can be positioned in above-mentioned notch 74 that is defined in the upper surface of the latch member 56. When the ring is in this particular position, the latch member 56 is restricted from sliding movement by the outer periphery of the ring abutting against the reduced end portion 64 of the latch guide 54. This locking arrangement restricts the enlarged end portion 66 of the latch member 56 from moving out of engagement with any one of the desired notches 46, 48, and 50 of the shank 42 of the scarifier tooth member 34.

It should be noted that the ring member 58 is made of any suitable spring type material, and when the end portions are inserted in apertures 70 and 72, the ring member is distorted and placed under stress as stated. When the ring member is positioned as seen in FIG. 5 in the notch 74, the ring is over center and due to the distortion caused by the misalignment of the end portions in apertures 70 and 72 as explained, the ring member will be continuously biased against the notch 74 and remain there regardless of the vibration received by the scraper framework when in a ground working position.

Referring now to FIGS. 6 and 7, it will be seen that the ring member has been placed over center in the opposite direction and has come to rest in an angular position with reference to the upper plane of the tool bar 24. In this particular position, the stress in the ring member 58 has reached a neutral condition and the ring will remain there until flipped back into the position shown in FIG. 5. This position is quite convenient in view of the fact that the operator can easily grasp the ring with his finger, and this is so even if he is wearing gloves or mittens.

In operation the scarifier tooth member 34 is disposed in the slots 36 and 38 and the shank portion 42 is slid up or down in the slots to bring one of the notches 46, 48, or 50, into alignment with the latch member 56. At this time, the latch member 56 and the ring locking member 58 would be positioned as shown in FIG. 6. When the desired adjustment of the scarifier member was reached, the latch member 56 would be returned to the position shown in FIGS. 4 and 5, and the ring member 58 would be flipped over center and engaged with notch 74 of the latch 56, thereby locking the sacrifier tooth 34 to the tool bar 24. As previously mentioned, the distortion of the ring 58 caused by the location of the spaced apart apertures 70 and 72 in the latch member 56 will continuously bias the ring member 58 against the notch 74.

FIGS. 3, 8, and 9 show the various adjusted positions of the scarifier tooth 34. The full line position seen in FIG. 3 is the same as that seen in FIG. 1, in which the scarifier tooth member is in its deepest ground penetrating position. In this position, latch member 56 is engaged in the notch 50. The dot-dash lines in FIG. 3 represent the sacrifier member 34 in its moderate ground penetrating position utilizing the notch 48 in engagement with the latch member 56. FIG. 8 shows the quick transport or raised position of the tooth 34. This particular position provides a convenient non-working position in which the operator can quickly remove the scarifier teeth 34 from a ground working position and provide a clearance between the tooth element 44 and the ground surfaces. In this particular position, the notch 46 is brought into engagement with the rearward side of the slot 36 and the latch member 56 is in engagement with the forward side of the tooth shank 42. The position shown in FIG. 9 illustrates a fully raised non-working position for the scarifier tooth members. The tooth members 34 have been completely removed from the tool bar and inserted through the top slot 36 and the notch 46 brought into alignment with the latch member 56 and retained there. This particular position provides for the maximum clearance between the sacrifier tooth members 34 and the ground surface while still retaining all the parts with the machine where they are immediately available when it is desired to restore them to working position. It will be also noted that the scarifier tooth elements can be completely removed from the tool bar without the possible loss of the latch 56. When the scarifier tooth members 34 are completely removed from the tool bar 24, the latch 56 is merely positioned, as shown in FIG. 2 and will remain in this position until such time as the tooth members are again positioned on the tool bar 24.

While only one embodiment has been described specifically, it will be apparent to those skilled in the art that alterations and substitutions of mechanical equivalents may be made without departing from the true spirit and scope of the invention.

What I claim as new and desire to secure by Letters Patent of the United States is:

1. In a mechanism for locking a scarifier tooth to a supporting bar having shank receiving slots spaced from each other in an up-and-down direction, the sacrifier tooth having a shank portion disposed in said slots, the combination of a guiding member fixed to said supporting bar and overlying one of said slots, a latch member slidable in said guiding member in a direction transverse to said shank, said guiding member defining a first notch aligned with the slots in said supporting bar so as to admit a shank disposed in said slots, an enlarged portion on said latch member positioned to obstruct said notch when said latch member is shifted in one direction and to contact said guiding member and positively limit sliding movement in said direction, a scarifier tooth shank in said slots and said notch, said shank defining a second notch positioned to register, in one position of said shank, with the path of sliding movement of said enlarged portion of said latch when shifted in said one direction, said latch having another position wherein said enlarged portion is clear of said first notch for shifting of said shank in said slots, and a grip member pivoted to said latch member at a point spaced from said enlarged portion and biased to swing to a position yieldingly pressing against said latch member outside of said guiding member in position to engage said guiding member in the event of movement of said latch member in a direction opposite to said one direction, whereby said latch member is locked in position against displacement in either direction, and said grip member being swingable away from said latch member into another position wherein it is yieldingly held in a position projecting from said latch member and said supporting bar to be readily grasped for sliding said latch member in said guiding member.

2. In a mechanism for locking a scarifier tooth to a supporting bar having shank receiving slots spaced from each other in an up-and-down direction, the scarifier tooth having a shank portion disposed in said slots, the combination of a guiding member fixed to said supporting bar and overlying one of said slots, a latch member slidable in said guiding member in a direction transverse to said shank, said guiding member defining a first notch aligned with the slots in said supporting bar so as to admit a shank disposed in said slots, an enlarged portion on said latch member positioned to obstruct said notch when said latch member is shifted in one direction, a scarifier tooth shank in said slots and said notch, said shank defining a second notch positioned to register, in one position of said shank, with the path of sliding movement of said enlarged portion of said latch when shifted in said one direction, said latch having another position wherein said enlarged portion is clear of said first notch for shifting of said shank in said slots, and a grip member shiftably mounted on said latch member at a point spaced from said enlarged portion and biased to a position to engage said guiding member in the event of movement of said latch member in a direction opposite to said one direction, whereby said latch member is locked in position against displacement in said other direction.

3. In a mechanism for locking a scarifier tooth to a supporting bar having shank receiving slots spaced from each other in an up-and-down direction, the scarifier tooth having a shank portion disposed in said slots, the combination of a guiding member fixed to said supporting bar and overlying one of said slots, a latch member slidable in said guiding member in a direction transverse to said shank, said guiding member defining a first notch aligned with the slots in said supporting bar so as to admit a shank disposed in said slots, an enlarged portion on said latch member positioned to obstruct said notch when said latch member is shifted in one direction and to contact said guiding member and positively limit sliding movement in said direction, a scarifier tooth.

shank in said slots and said notch, said shank defining a second notch positioned to register, in one position of said shank, with the path of sliding movement of said enlarged portion of said latch when shifted in said one direction, said latch having another position wherein said enlarged portion is clear of said first notch for shifting of said shank in said slots, and a grip member pivoted to said latch member at a point spaced from said enlarged portion and biased to swing to a position yieldingly pressing against such latch member outside of said guiding member, in position to engage said guiding member in the event of movement of said latch member in a direction opposite to said one direction, whereby said latch member is locked in position against displacement in either direction, and said grip member being swingable away from said latch member into another position wherein it will engage said guiding member and prevent sliding of said latch beyond a predetermined position in a direction opposite to said one direction.

4. In a mechanism for locking a scarifier tooth to a supporting bar having shank receiving slots spaced from each other in an up-and-down direction, the scarifier tooth having a shank portion disposed in said slots, the combination of a latch member slidable on said supporting bar in a direction transverse to said shank, a portion on said latch member positioned to obstruct one of said slots when said latch member is shifted in one direction, a scarifier tooth shank in said slots, said shank defining a notch positioned to register, in one position of said shank, with the path of sliding movement of said obstructing portion of said latch when shifted in said one direction, said latch having another position wherein said obstructing portion is clear of said slot for shifting of said shank in said slots, and a grip member on said latch member at a point spaced from said obstructing portion and in position to prevent movement of said latch member in a direction opposite to said one direction.

References Cited in the file of this patent
UNITED STATES PATENTS

| | | |
|---|---|---|
| 43,145 | Warner | June 14, 1864 |
| 2,477,477 | Cook | July 26, 1949 |
| 2,802,655 | Davis et al. | Aug. 13, 1957 |